United States Patent [19]
Cole et al.

[11] Patent Number: 5,906,436
[45] Date of Patent: May 25, 1999

[54] COMPOSTING SYSTEM

[75] Inventors: Arthur Cole, Rowely, Mass.; Carl Fronhofer, Salem, N.Y.; Donald Gillis, Greenwich, N.Y.; Daniel Hagen, Saratoga Springs, N.Y.; Mark Morrison, Lynn, Mass.; Mark Sesera, Greenwich, N.Y.

[73] Assignee: United States Filter Corporation, Palm Desert, Calif.

[21] Appl. No.: 08/962,710

[22] Filed: Nov. 3, 1997

[51] Int. Cl.⁶ ..................................... B01F 13/00
[52] U.S. Cl. ........................ 366/346; 366/256; 366/261; 366/271
[58] Field of Search ................................ 366/346, 345, 366/344, 261, 271, 256; 241/293, 101.74; 172/101, 122; 56/104

[56] References Cited

U.S. PATENT DOCUMENTS

| | | | |
|---|---|---|---|
| 1,827,358 | 10/1931 | Giletti | 366/346 |
| 3,642,255 | 2/1972 | Gujer | 366/345 |
| 4,377,258 | 3/1983 | Kipp, Jr. | 366/345 |
| 5,459,071 | 10/1995 | Finn | 366/345 |

*Primary Examiner*—Tony G. Soohoo
*Attorney, Agent, or Firm*—Wolf, Greenfield & Sacks, P.C.

[57] ABSTRACT

A composting system for promoting maximum aerobic microbial activity in a composting bed. The system includes at least one composting bay for receiving composting material and an agitator for aerating and displacing composting material as it travels through the composting bay. The agitator has at least one structural frame member, and a conveyor, a feeder, and at least one bridge breaker that are mounted to the structural frame member. As the agitator travels through the bay, the feeder takes composting material from the bay and feeds it to the conveyor which discharges the composting material rearwardly into the bay behind the agitator. The bridge breaker displaces the composting material above the feeder causing the material to fall substantially evenly onto the feeder, thereby preventing large amounts of composting material from suddenly collapsing onto the feeder which can result in overload conditions on the feeder drive system.

42 Claims, 8 Drawing Sheets

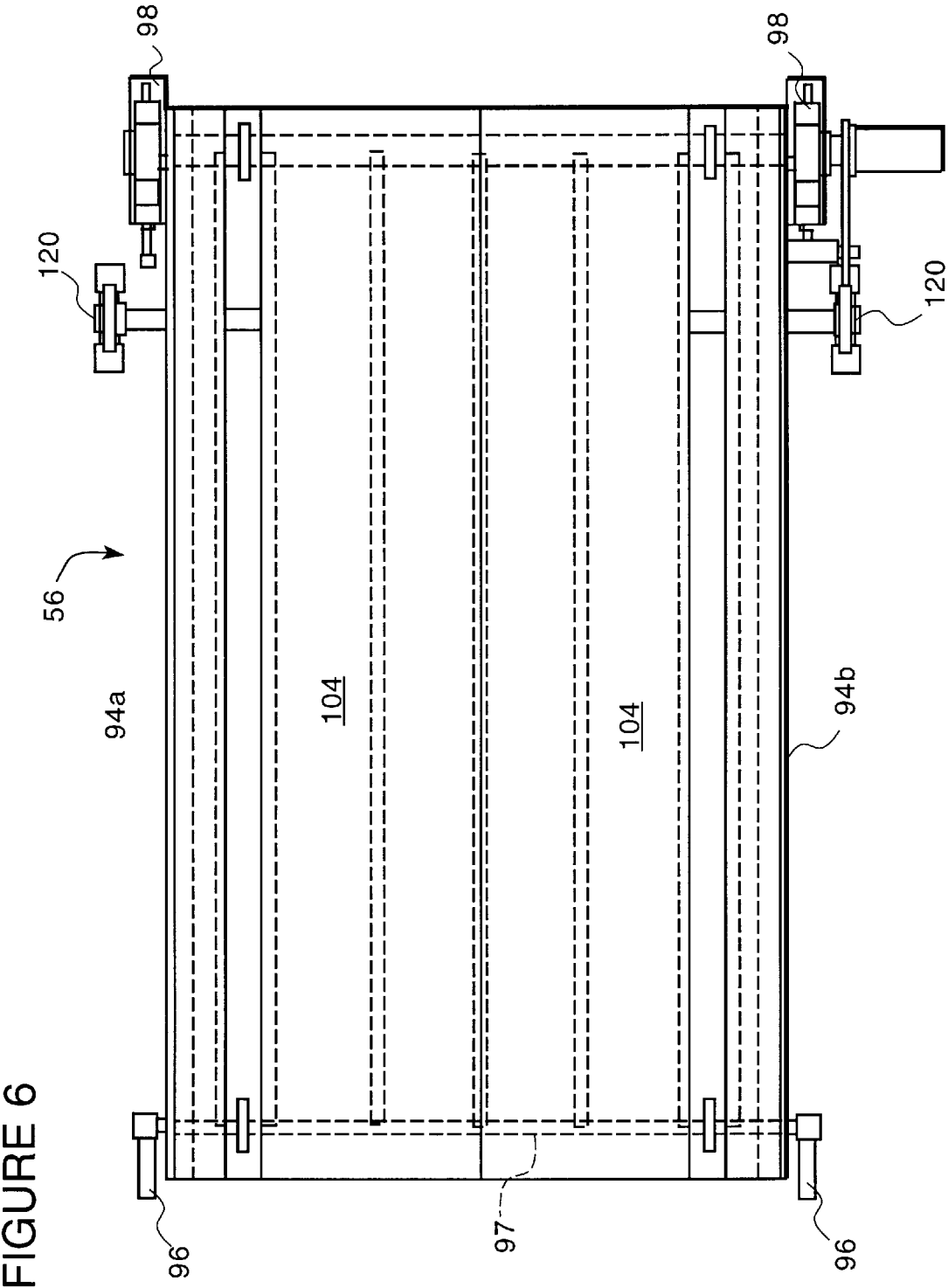

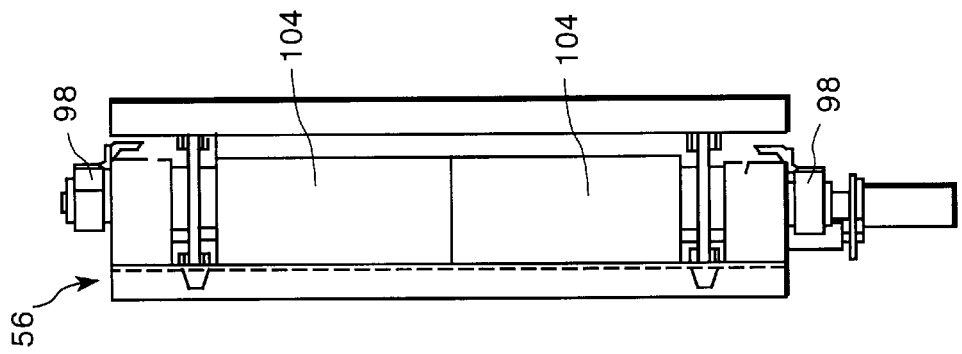
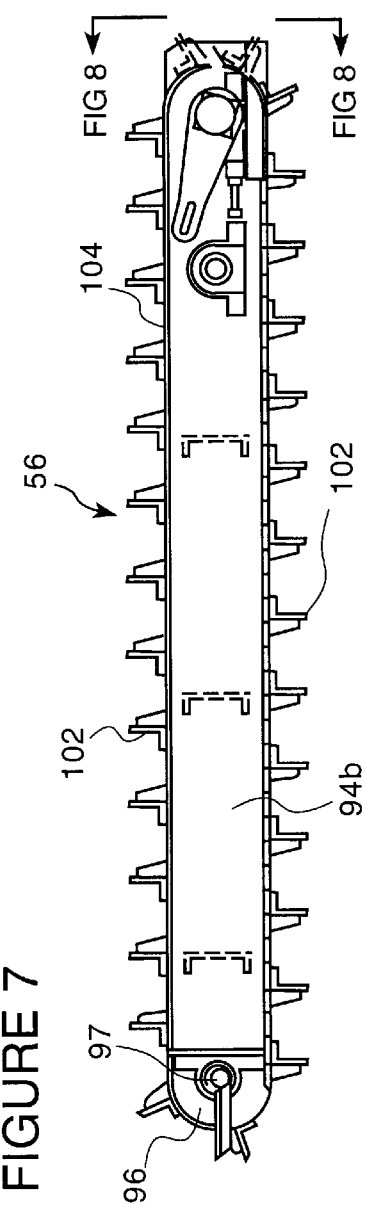

COMPOSTING SYSTEM

BACKGROUND OF THE INVENTION

1. Field of the Invention

The present invention is directed to the disposal of organic wastes through composting and, more specifically, to composting systems for large scale treatment of industrial and municipal wastes.

2. Discussion of the Related Art

Composting is a biological process of decomposition. Given adequate time and the proper environmental conditions, microorganisms turn raw organic matter into stabilized products. The products of composting include carbon dioxide, water, and a complex form of organic matter called compost, which is especially useful as a soil amendment. The key parameters in composting process management are the available carbon to nitrogen ratio, the moisture content, the oxygen content, and the temperature of the composting material.

Carbon serves primarily as a food source for the microorganisms involved in composting. Nitrogen is the primary constituent of protein which forms over 50% of dry bacterial cell mass and is, therefore, necessary for protein synthesis and the optimal growth of microbial populations in the compost pile. It is well known in the art that the preferred carbon-to-nitrogen ratio for composting is about 30 parts carbon for each part nitrogen by weight (30:1). At lower ratios the excess nitrogen supplied will be lost in the form of mobile nitrogen compounds, such as ammonia gas, and can cause undesirable odors or other environmental problems. Higher carbon-to-nitrogen ratios result in an insufficient supply of nitrogen for optimal microbial population growth resulting in a slow rate of degradation. The carbon-to-nitrogen ratio can be increased through the addition of materials high in carbon, such as fallen leaves, straw, woodchips, sawdust, bark, paper, and cardboard. The carbon-to-nitrogen ratio can be decreased by the addition of materials high in nitrogen, such as vegetables, coffee grounds, grass clippings, and manure or sewage.

It must be noted, however, that the carbon-to-nitrogen ratio is a useful measurement only when the degree of biological availability of the carbon is taken into account. Because microbial activity takes place on the surface of the composting material, the effect of the carbon-to-nitrogen ratio of a carbon rich material can be magnified by increasing the surface area of the material, such as by grinding or shredding. Furthermore, some carbon-rich materials, such as newspapers and straw, contain cellulose fibers that are highly resistant to microbial action. Although degradation will occur at relatively slow rates in these materials, chemical pretreatment can increase the degradation of these resistive materials.

Moisture content is another key environmental parameter of composting material. Microbially induced decomposition occurs most rapidly in liquid films found on the surfaces of organic particles. Whereas, inadequate moisture content inhibits bacterial activity, excess moisture content can inhibit the aerobic process. Excessive moisture content results in anaerobic microbial activity, as well as nutrient leaching. This anaerobic activity can produce undesirable odorous compounds, such as hydrogen sulfide. The moisture content of a composting pile is typically related to the carbon-to-nitrogen ratio in that degradable materials that are high in carbon are correspondingly low in moisture. Whereas, materials that are high in nitrogen are typically high in moisture. However, as the composting process completes the mesophilic stage (0–40° C.) and enters the thermophilic stage (40–60° C.), the heat produced can result in the evaporation of a significant amount of the resident moisture.

Excessive moisture content can also result in the leaching of essential nutrients from the composting pile, including phosphorous, potassium, and other trace minerals, which are essential to microbial metabolism. Although these nutrients are not normally limiting, they must be present in adequate supplies for microbial activity.

Oxygen content and temperature are important environmental parameters of composting that fluctuate in response to microbial activity which consumes oxygen and generates heat. As microorganisms oxidize carbon for energy, oxygen is used up, and carbon dioxide is produced. Without sufficient oxygen the process will become anaerobic and produce odorous compounds. Oxygen content is also linked to moisture content in that excessive moisture content can reduce the available oxygen supply resulting in anaerobic pockets within the composting pile.

The temperature of the composting pile varies according to the type and size of the microorganism community resident therein. Mesophilic microorganisms are dominant from the initial stage of decomposition until the temperature rises above about 40° C. and rapidly breakdown the soluble, readily degradable compounds. The mesophilic microorganisms become less competitive as the temperature rises above about 40° C., and thermophilic microorganisms take over. Current Environmental Protection Agency regulations require temperatures in excess of 55° C. (131° F.) for several days to destroy pathogens within the composting pile. Because temperatures over about 65° C. significantly reduce microbial populations and limit decomposition rates, the ideal operating temperature range for a composting pile is relatively narrow.

There are several different reasons why composting remains an invaluable practice. Yard and food wastes make up approximately 30% of the waste stream in the United States. Composting most of these waste streams would reduce the amount of municipal solid waste requiring disposal by almost one fourth, while at the same time provide a nutrient-rich soil amendment.

As composting has become increasingly popular in recent years as a means for recycling a variety of organic materials as part of municipal and industrial solid waste management programs, various composting technologies have been or are being developed. These technologies include, for example, static pile composting, windrow composting, aerated windrow composting, and in-vessel composting employing horizontal agitated bay reactors and vertical reactors. In all such systems, cost effectiveness and automation are desirable. Regarding cost, reducing the space required for a given throughput of composting material is a well recognized need in the industry. Composting operations employing windows, for example, are thought to have an undesirably low ratio of composting materials throughput to processing area square footage, while in-vessel and closed reactors compost material may typically be mounded 20 to 30 feet high. This mounding, however, produces technical difficulties regarding the adequacy of aeration in the reactor vessel leading, in some cases, to unacceptably large pockets of anaerobic activity within the pile. This anaerobic activity leads to the equally undesirable need for removal of odorous compounds from the reactor vessel environment before exhausting it to the atmosphere.

Certain in-vessel composting systems, particularly those comprising open bays within a building, have been used with excellent results. One system of this type employs automated agitators to thoroughly mix and aerate composting material in parallel bays. Starting at the discharge end of an open elongated composting bay, the agitator moves through the bed of composting material toward the loading end of the bay. Typically, the agitator travels through each bay mixing the material and rearwardly displacing it from the loading end toward the discharge end. As the agitator progresses through the bay, a moveable member repeatedly repositions itself in the exhaust stream such that the distance of rearward displacement of composting material is gradually increased to accommodate material which has had progressively less residence time in the bay and, accordingly, has experienced less reduction in the volume due to decomposition and moisture content reduction. An agitator of this type is described by Hagen et al., in U.S. Pat. No. 5,387,036 which is incorporated herein in its entirety by reference. Agitators of this type generally comprise a feeder, typically a rotating toothed drum, and a conveyor. In operation, the rotating drum takes composting material from the bed forward of the agitator and feeds it rearwardly to the conveyor, which in turn discharges the material aft of the agitator. As discussed above, the discharge is regulated as it is rearwardly displaced by the conveyor to produce a bed of substantially uniform depth aft of the agitator as it passes through the bay.

As demands on municipal composting systems increase, the capability of treating larger volumes of composting material in relatively small reaction vessels becomes increasingly desirable. Accordingly, existing systems having a plurality of open horizontal bays, typically between about 6 and 10 feet wide and up to about 300 feet long have been excessively loaded forming composting beds of increasing heights. The plurality of open bays are typically placed side by side and can be served by a single agitator. These systems can be used to compost a wide variety of materials, and the composting rate can typically be regulated to meet varying demand. However, when these large bays are at or near full capacity, the action of the rotating drum of the agitator tends to burrow through the composting pile as the agitator progresses through the bay. As the burrowing action continues, the weight of the undisplaced composting material can become sufficiently great to allow large quantities to suddenly collapse onto the rotating drum, thus slowing its rotation and, consequently, the agitator's progression through the bay. If a sufficient quantity of composting material collapses, the rotating mechanism can stall, resulting in costly delays while the unit is stopped, reversed, cleaned and/or repaired.

Furthermore, in a typical large scale composting operation, air contact along with the rising heat produced by microbial action combine to dry the upper portion of the composting bed, forming a crust-like layer of composting material near the top. As the agitator travels through the bay, large sections of the crust remain intact for extended periods and then, suddenly, crack and fall onto the rotating drum, which increases the stalling frequency of the rotating mechanism.

Attempts to obviate this problem include increasing the diameter of the rotating drum to approximately the maximum height capacity of the bay. This has proven to be an untenable solution, however, because of the added materials costs involved in manufacturing the larger drums coupled with the added energy costs involved in rotating the drum. Furthermore, the use of larger drums adds to the overall size and weight of the agitator resulting in additional problems, including making the transportation of the agitator between bays by existing equipment more difficult.

As the demand on the present municipal and industrial composting systems continues to grow, new and improved methods of increasing the output of existing facilities are needed to supply the market. However, as discussed above, certain critical environmental parameters must be maintained in the composting pile to ensure efficient, environmentally sound degradation of composting materials.

SUMMARY OF THE INVENTION

Accordingly, the present invention is directed to an agitator and composting system capable of maintaining an optimal environment for composting operations. Advantages of the present invention include its ability to treat deep composting beds quickly, efficiently, and for extended periods without maintenance, its ability to efficiently treat composting beds of varying heights, its ability to efficiently treat composting beds having a crust-like upper portion, its ability to increase the oxygen content of a composting bed thereby increasing aerobic microbial activity, its ability to maintain composting bed temperatures within predetermined mesophilic and thermophilic ranges, and its ability to treat a large volume of composting material in a relatively small reaction vessel.

The system includes at least one composting bay for receiving composting material, and an agitator for aerating and displacing composting material as it travels through the composting bay. The agitator has at least one structural frame member. A conveyor, a feeder, and a bridge breaker are mounted to the structural frame member. As the agitator travels through the bay, the feeder takes composting material from the bay and feeds it to the conveyor which discharges the composting material rearwardly into the bay behind the agitator. The bridge breaker displaces the composting material above the feeder causing the material to fall substantially evenly onto the feeder, thereby preventing large amounts of composting material from suddenly collapsing onto the feeder which can result in overload conditions on the feeder drive system.

In various embodiments, the feeder can comprise a rotating drum having outwardly extending protrusions spaced over an outside circumferential surface of the drum for sheering into the composting bed immediately forward of the agitator as it moves through the bay. Likewise, the bridge breaker can include a rotatably mounted displacement shaft having a plurality of outwardly extending protrusions spaced over an outside circumferential surface of the shaft for sheering into the bed of composting material above the feeder. The bridge breaker can be pivotably mounted to the structural frame of the agitator allowing for oscillating vertical movement of the bridge breaker above the feeder as the agitator passes through the composting bay. The agitator can include two or more bridge breakers occupying discrete horizontal positions above the feeder to provide staged agitation of the upper portion of the composting bed. The agitator can include an adjustable discharge shroud for regulating the discharge of the composting material by the conveyor thus providing a bed of substantially uniform height behind the agitator as it passes through the bay.

In another embodiment of the present invention, the composting system includes a ventilation system to selectively conduct air through the composting material and control the oxygen content and temperature of the bed to promote maximum aerobic microbial activity in the bed. The ventilation system has a sensor to monitor the temperature of the composting material and to generate a signal in response to the temperature. A controller, in communication with the sensor, receives the signal and actuates the ventilation system when the temperature of the composting material reaches a predetermined value. A blower is provided in communication with the controller to conduct air through the composting material when the ventilation system is actuated.

In another embodiment of the present invention, a composting facility is provided. The composting facility includes a plurality of composting bays housed in an enclosure, such as a building. At least one agitator having a conveyor and a compost agitating assembly is provided to aerate and displace the material in the composting bays. The compost agitating assembly includes a feeder and a bridge breaker. At least one transfer dolly is positioned near an end of at least one of the bays to transport the agitator from one bay to another. To facilitate transport of the agitator, the compost agitating assembly is rotatably connected to the structural frame of the agitator. An assembly motor can be provided to move the assembly between a lowered and a raised position. In the raised position, the agitator can be easily loaded onto the transfer dolly.

In another embodiment of the present invention, a method of aerating and displacing composting material in a composting bay with an agitator is provided. The agitator includes at least one structural frame member, a feeder, a conveyor, and a bridge breaker. The method comprises contacting the composting material with the bridge breaker such that the material falls substantially evenly onto the feeder. The composting material is then taken from the bay by the feeder and fed to the conveyor which discharges the material from the agitator. In an alternative embodiment, the method includes oscillating the bridge breaker in a substantially vertical plane above the feeder to further displace the material above the feeder.

BRIEF DESCRIPTION OF THE DRAWINGS

The foregoing and other advantages will be more fully appreciated from the following drawings in which:

FIG. 6 is a top plan view of a conveyor according to one embodiment of the present invention;

FIG. 7 is a side elevational view of a conveyor according to one embodiment of the present invention;

FIG. 8 is a section view of the conveyor shown in FIG. 7 taken along section line 8—8.

DETAILED DESCRIPTION

The present invention is directed to a composting system and agitator capable of maintaining an optimal environment for composting operations. While the composting system described herein can be employed in a variety of applications within the scope of the present invention, the preferred embodiments described in greater detail below are modular, the basic module being an open horizontal bay usually between about 6 and 10 feet wide, between about 6 and 8 feet high, and up to about 300 feet long. A plurality of open bays can be placed side by side and served by a single agitator. The system can be used to compost a wide variety of materials, and the rate of composting can be regulated to meet varying levels of demand. The open bays are readily enclosed within a building from which air can be exhausted directly to the atmosphere or through odor controlling biofilters, chemical scrubbers, or other methods of odor control.

Figure 1:
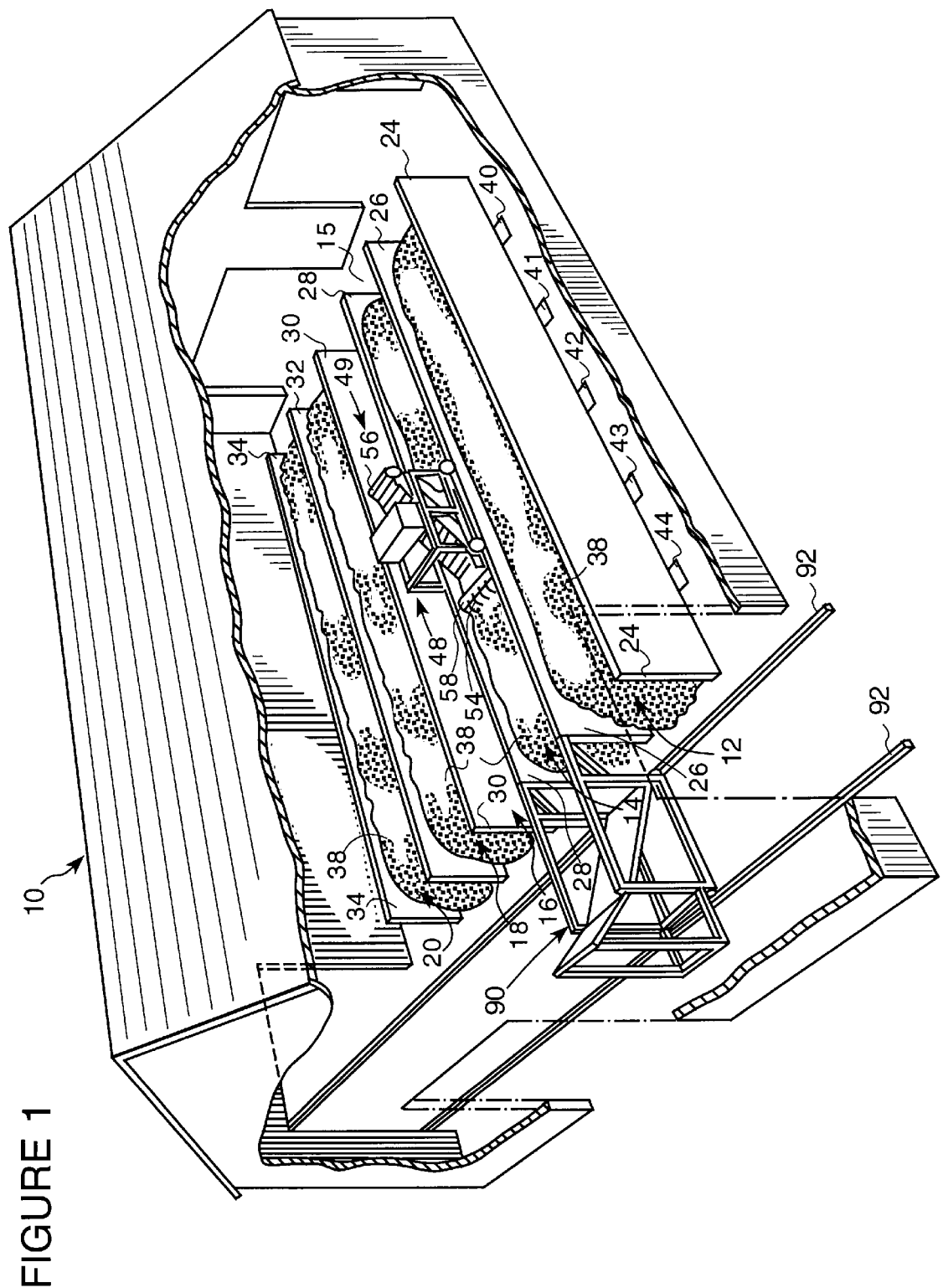
FIG. 1 is a partial cut-away perspective view of a composting facility according to one embodiment of the present invention.

Referring now to FIG. 1, an exemplary composting facility 10 is shown. Facility 10 comprises multiple adjacent parallel composting bays 12, 14, 16, 18, and 20. Bays 12–20 can be formed by parallel upstanding walls 24, 26, 28, 30, 32, and 34. Other suitable bay forming methods will be readily apparent to those skilled in the art in view of the present disclosure. A bed 38 of composting material in each bay is seen to have a substantially uniform height. The height of bed 38 can be maintained below the height of walls 24–34 to allow for aeration and settling of the bed without intrusion into adjacent bays. For example, a bed of up to about 7 feet could be maintained in an 8 foot high composting bay. To maintain an acceptable carbon to nitrogen ratio, the solids content of the composting material at receiving end 15 of bay 14 is typically less than 50%, by weight, preferably between about 30% and 45%, by weight, more preferably between about 38% and 42%, by weight, and most preferably about 40%, by weight. Due to microbial action, the solids content preferably will have increased by discharge end 17 of bay 14 to between about 50% and 90%, by weight. Composting material typically is resident in the composting bays from between about 18 and 24 days. Those skilled in the art will recognize that material discharged from the bay may require finished product curing as the composting pile returns from the thermophilic stage to the mesophilic curing stage.

Material loaded into the composting bay may also be pre-treated. Typically, this involves chopping or shredding the material to increase the surface area and, consequently, the available carbon content of the material. For example, yard waste, such as tree branches, may be reduced in size by use of a chopper/shredder, and the like. Post processing may include screening to remove woodchips or other larger sized components of the material which can be recycled. The composting material may also may be retained on site for extended periods. In cold winter areas, for example, finished composting material suitable for use as a soil amendment or the like may be retained on the composting site during winter months.

Figure 2:
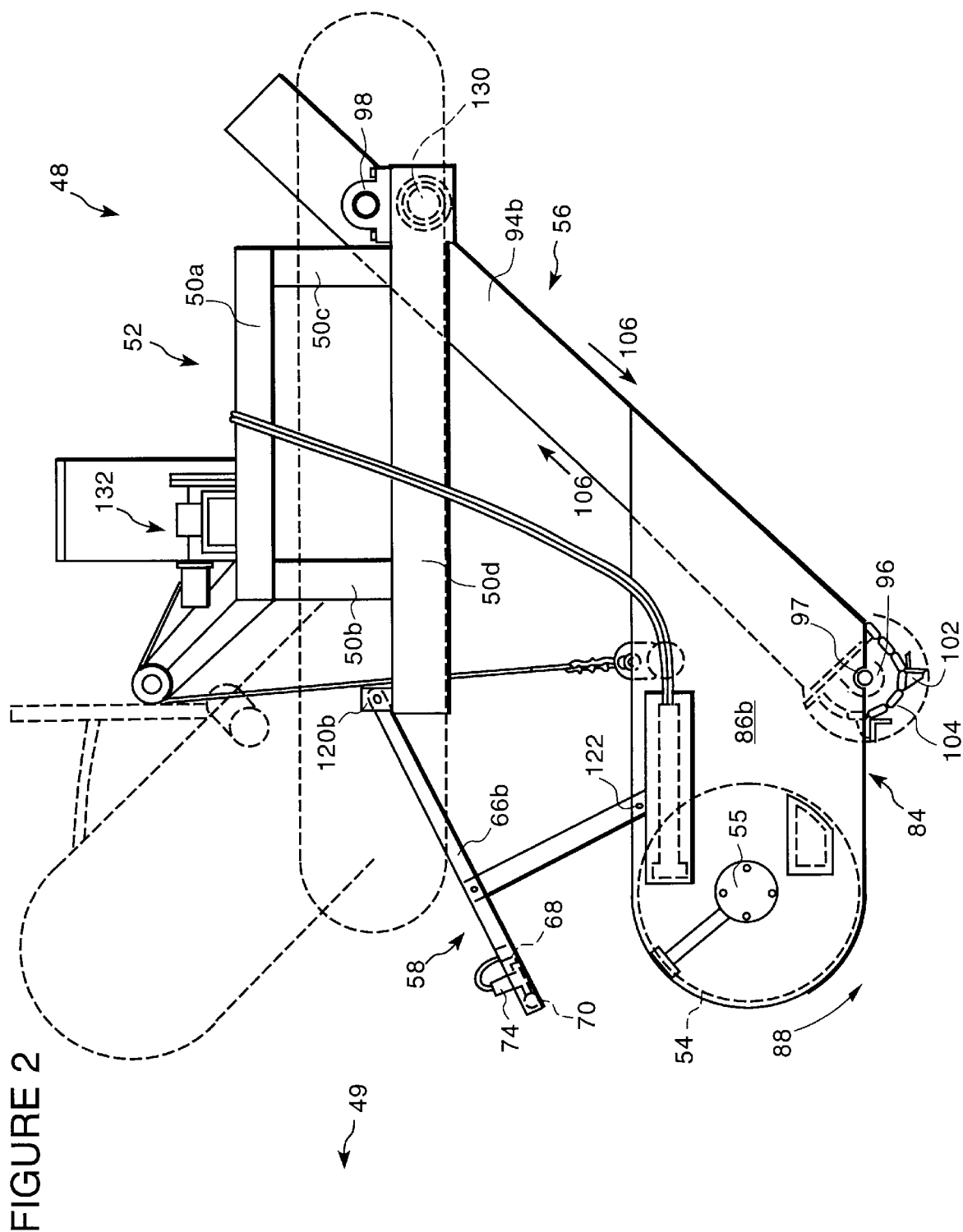
FIG. 2 is a side elevational view of an agitator according to one embodiment of the present invention.

An agitator 48, as shown in FIGS. 1, 2, 4, 5, and 9, comprises several structural frame members 50(a–i), a feeder 54, a conveyor 56, and a bridge breaker 58. Structural frame members 50(a–i) form a main frame 52 which is adapted to ride on wheels 60 on rails 62 on bay walls 24–34 over the top of composting material 38. Agitator 48 travels in the direction of arrow 49 as it services composting material 38. As agitator 48 travels through the composting bay, bridge breaker 58 (as shown in FIG. 2) contacts the upper composting mass located above feeder 54, thus causing the composting material in this area to fall substantially evenly onto feeder 54. Feeder 54 then removes the composting material from the bay and feeds it to conveyor 56, which discharges the composting material rearwardly such that the composting material is aerated before returning to the bay behind agitator 48.

Figure 3:
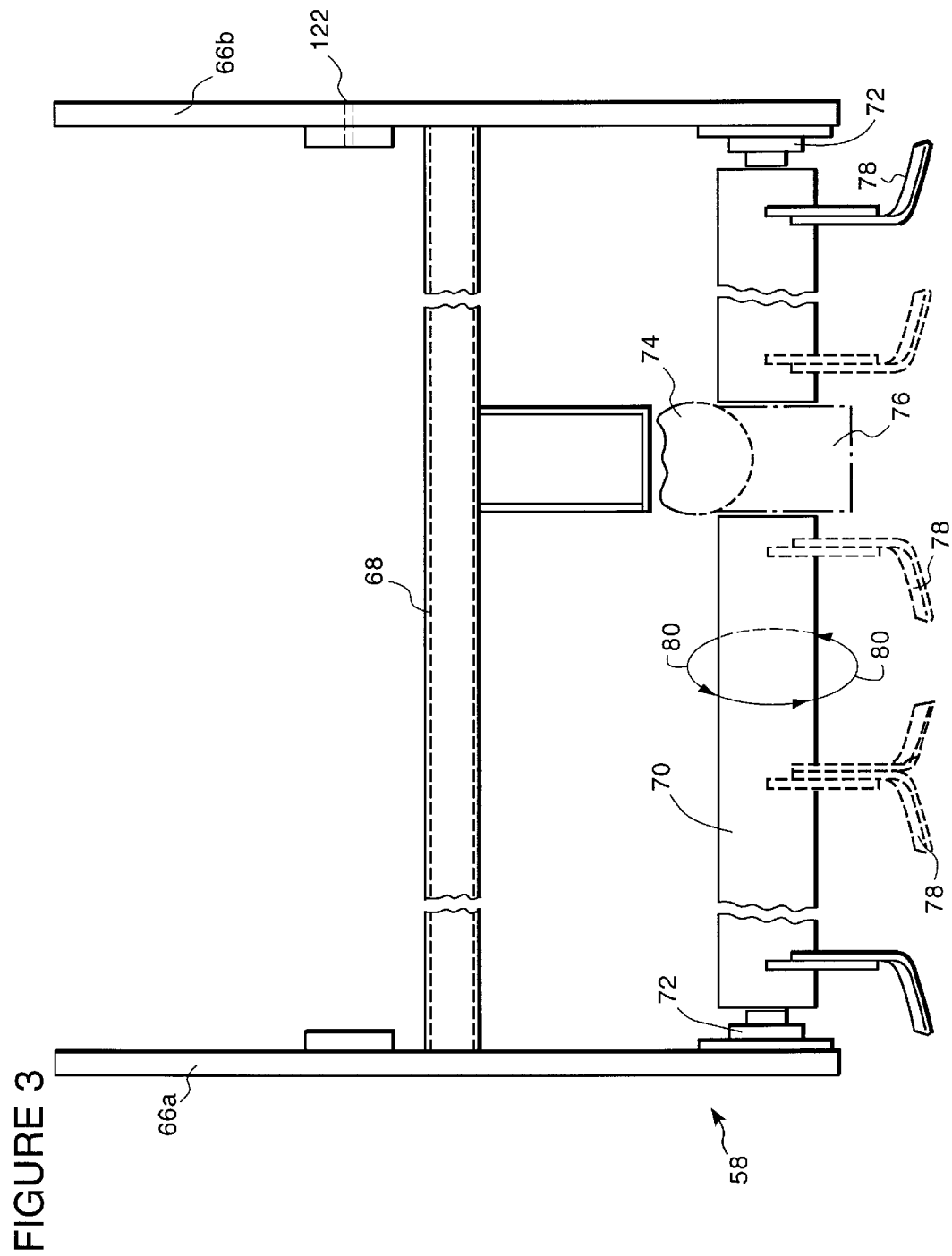
FIG. 3 is a top plan view of a bridge breaker according to one embodiment of the present invention.

As shown in FIG. 3, bridge breaker 58 of the present invention includes a pair of parallel support members 66a and 66b with a cross member 68 disposed between and perpendicular to the support members. A displacement shaft 70 is also mounted to support members 66a and 66b about a transverse axis 71. Optionally, displacement shaft 70 is rotatably mounted to support members 66a and 66b by pinions 72 to allow for rotation of the shaft as it travels through the composting bay. Preferably, a power source 74 is provided in communication with displacement shaft 70 through a hydraulic motor (not shown) and a gearbox 76. Power source 74 can be selected from art recognized electrical, hydraulic, and pneumatic power sources depending on the rotational speed and torque requirements of a particular application. Preferably, power source 74 is electrical or hydraulic and, more preferably, hydraulic. The rotation speed of displacement shaft 70 can be controlled by a sensor and actuator system (not shown) that measures the rotation speed of the agitator's wheels 60 and produces a wheel-speed signal corresponding thereto. In this manner, when displacement shaft 70 experiences increased resistance from the composting material, which lowers the forward velocity of the agitator, the power to the displacement shaft is increased to overcome the resistance.

In the embodiment shown in FIG. 3, displacement shaft 70 is provided with outwardly extending protrusions 78 for sheering into bed 38 of composting material above feeder 54 (as shown in FIG. 2). If provided, outwardly extending protrusions 78 are spaced over the outside circumferential displacement shaft surface. The size and shape of protrusions 78 can be chosen by a skilled practitioner based on operating conditions, such as the consistency of the composting material, the height of the composting bed, and the number of bridge breakers employed. Acceptable protrusions include substantially rigid teeth, sections of metallic chain (i.e., a flailer), helical ridges, and the like. In operation, displacement shaft 70 rotates preferably in the direction of arrow 80 to provide a flow of composting material down to feeder 54. It is noted, however, that the direction of rotation of displacement shaft 70 is selected based on the discrete circumstances in a given application and can be, for example, in the direction opposite arrow 80.

Figure 4:
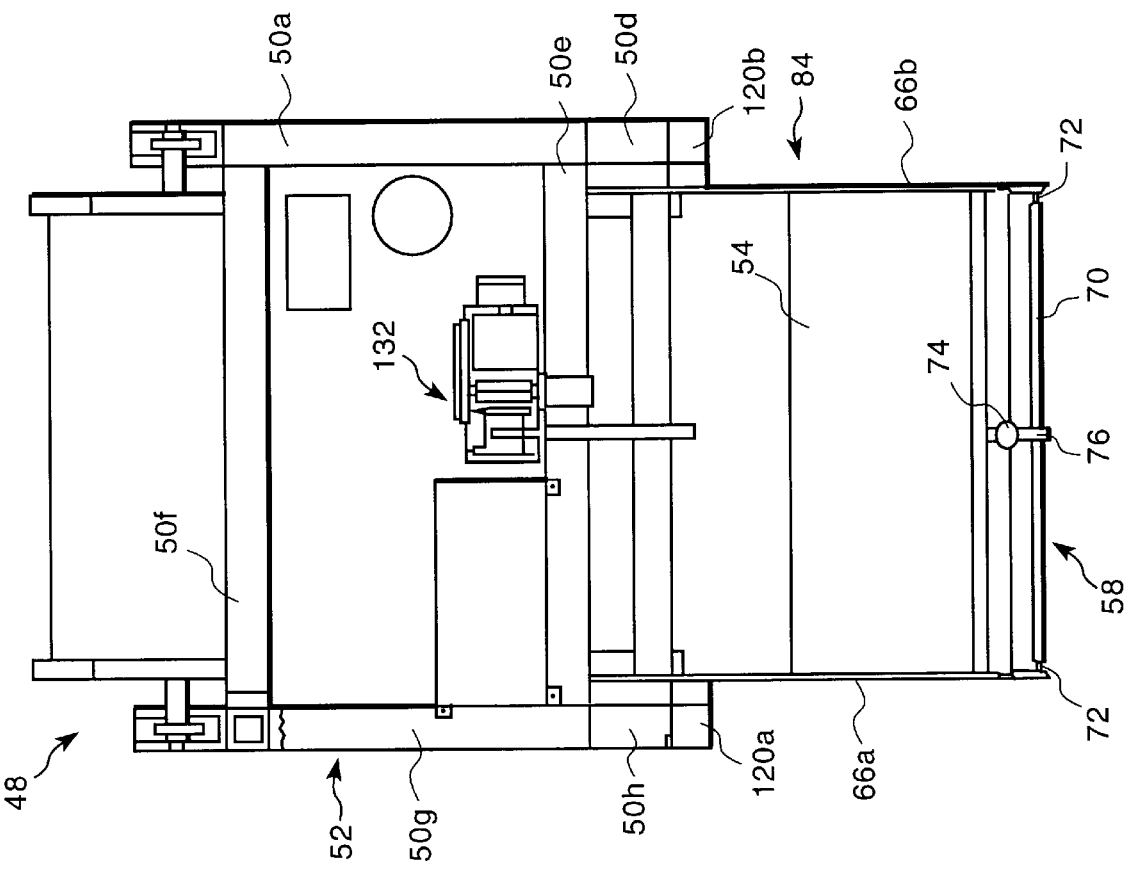
FIG. 4 is a top plan view of an agitator according to one embodiment of the present invention.
Figure 5:
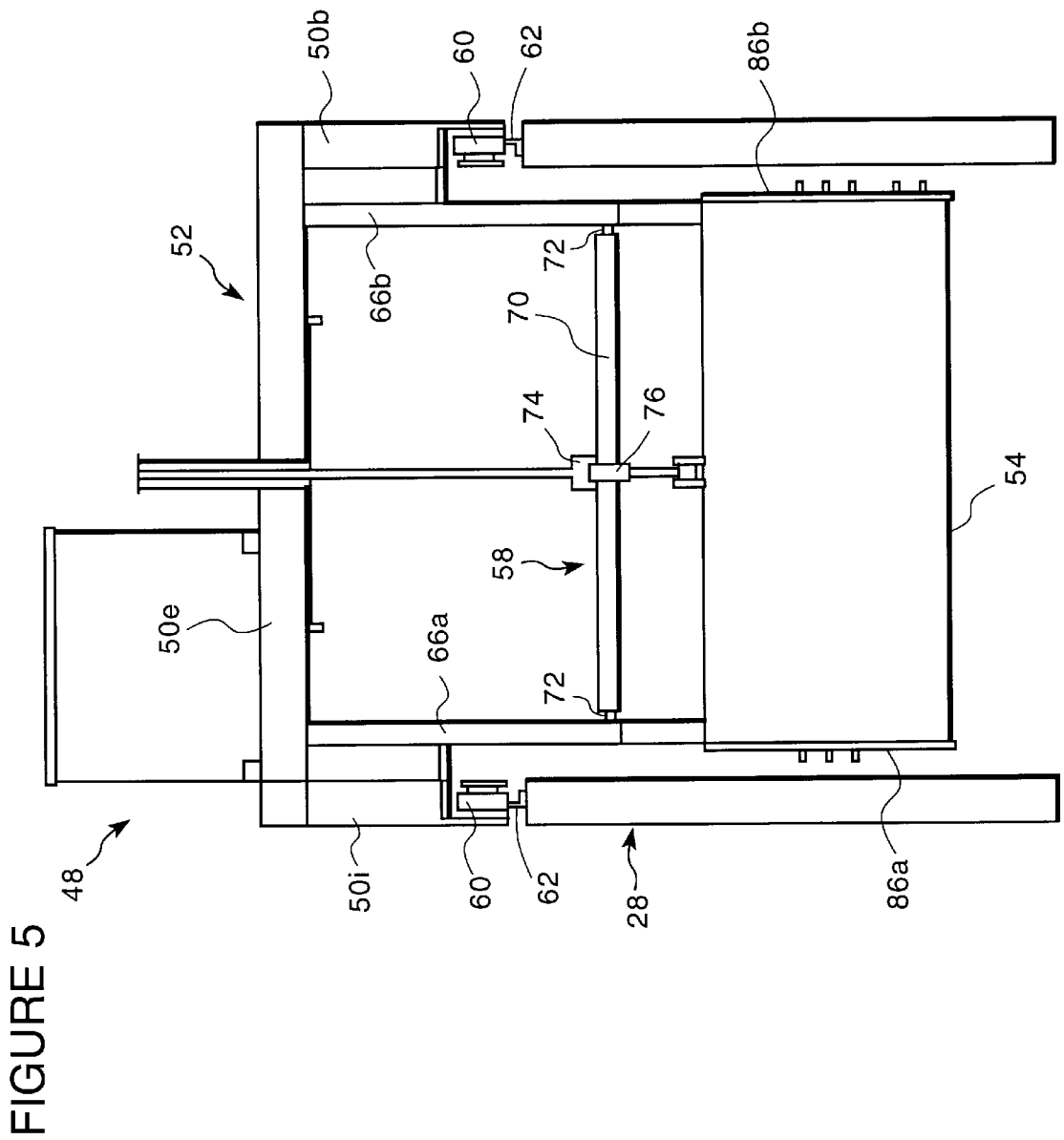
FIG. 5 is a front elevational view of an agitator according to one embodiment of the present invention.

As shown in FIGS. 2, 4, and 5, bridge breaker 58 can be mounted to agitator 48 such that it extends outwardly and forward of main frame 52. Preferably, bridge breaker 58 is positioned relative to feeder 54 along a substantially horizontal plane above the uppermost surface of feeder 54 such that, in use, bridge breaker 58 contacts the composting material above feeder 54 and directs the material downwardly to feeder 54. Typically, bridge breaker 58 is mounted to main frame 52 by brackets 120a and 120b about 2 feet above the uppermost surface of feeder 54 to provide sufficient room for bridge breaker operation. It will be evident to those skilled in the art, however, that the proper spacing of bridge breaker 58 relative to feeder 54 should be based on operating conditions, such as the height and density of the composting bed. Optionally, bridge breaker is pivotably mounted to a feeder frame 84 by pinions 122 to provide for oscillating movement in a substantially vertical plane above feeder 54 to further displace composting material. If necessary, a second power source (not shown) can be provided to oscillate bridge breaker 58. In alternative embodiments (not shown), agitator 48 can include two or more bridge breakers mounted to main frame 52 and occupying discrete horizontal positions above feeder 54. In situations where the height of the composting bed is substantially greater than the diameter of feeder 54, the uppermost bridge breaker, if provided, can be positioned forward of the lower bridge breaker(s) to provide a staged agitation of the upper portion of the composting bed as agitator 48 progresses through the bay.

Feeder 54 retrieves composting material from the bay and feeds it to conveyor 56. A lower return 96 of conveyor 56 is located in close proximity thereto. One type of feeder useful in the agitator of the present invention is a rotating drum. As shown in FIGS. 2, 4, and 5, feeder 54 is mounted to feeder frame 84 carried by conveyor 56. In the embodiment illustrated, feeder frame 84 comprises parallel laterally spaced dual plate frame members 86a and 86b on opposite sides of conveyor 56. Feeder 54 is mounted to feeder frame 84 transversely (i.e., for rotation about a horizontal feeder axis perpendicular to the direction of travel in the bay). Optionally, scraper bars (not shown) may be provided for clearing the lower bay walls. These bars may be mounted to agitator feeder axle ends 55 outside plate frame members 86a and 86b for rotation proximate the bay walls as agitator 48 moves forward. Similar scraper bars may be mounted to the outside ends of lower mounting shaft 97 of conveyor 56.

Feeder 54 can have outwardly extending protrusions (not shown) for sheering into bed 38 of composting material in front of agitator 48. If provided, the outwardly extending protrusions are spaced over the outside circumferential feeder surface. Typically, feeder 54 rotates in the direction of arrow 88, although rotation opposite arrow 88 may be desired under various circumstances. In a typical commercial composting operation, feeder 54 will rotate at a speed sufficient to move the particular composting material to conveyor 56. It has been found that a rotation speed of approximately 75 RPM is sufficient for most materials, although other suitable rates of rotation can be chosen based on a given composting operation. The rotation speed of feeder 54 can be controlled in the same manner as that of displacement shaft 70. As discussed above, a sensor and actuator system (not shown) can be provided to measure the rotation speed of the agitator's wheels 60 and produce a wheel-speed signal corresponding thereto. When feeder 54 or displacement shaft 70 experience increased resistance from the composting material, which lowers the forward velocity of agitator, the power to the feeder and/or the displacement shaft is increased to overcome the resistance. Because feeder 54 feeds composting material to conveyor 56, it is substantially the same width as conveyor 56 and extends laterally almost the full width of the bay. Feeder 54 rotates within partial feeder housing 89 (FIG. 9) which aids in controlling the flow of composting material.

In the embodiment illustrated in FIGS. 2, 6, 7, and 8, conveyor 56 has two inclined plates 94a and 94b which extend upwardly and rearwardly from lower return 96 to an upper return 98 above the bay walls. In a typical embodiment, the length of conveyor 56 from lower return 96 to upper return 98 is sufficient to position upper return 98 at a height above that of the bay walls and, consequently, the composting material to allow for rearward displacement of the composting material as agitator 48 travels down the bay. Therefore, the length of conveyor 56 can be between about 10 feet and 13.5 feet depending on the height of the bay walls. A plurality of lifting cleats 102 extend transversely across conveyor 56 and are substantially equal in width to upper and lower returns 98 and 96. Lifting cleats 102 are connected at spaced locations along a pair of endless drive lines 104 which are preferably chain driven over upper and lower returns 98 and 96. In operation, lifting cleats 102 travel in the direction of arrows 106 over inclined plates 94a and 94b. On the forward side of conveyor, lifting cleats 102 push composting material rearwardly over inclined plates 94a and 94b and discharge the material rearwardly at the top of conveyor 56 before returning down the backside of the conveyor. Typically, conveyor 56 is run at a speed that is sufficient to displace the composting material several feet behind agitator 48. A suitable speed is based on the particular composting operation. Alternative conveyor configurations for carrying composting materials can include, for example, augers and the like.

Figure 9:
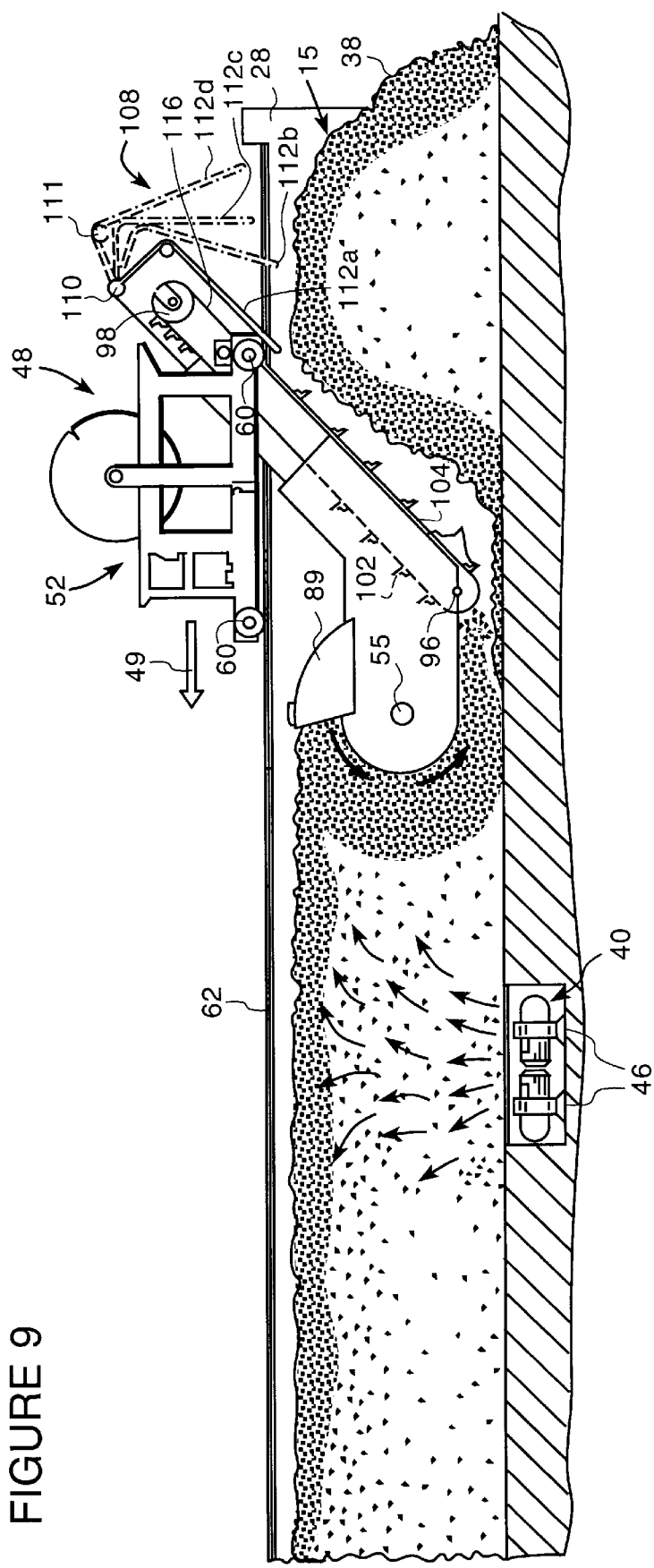
FIG. 9 is a side elevational view of a discharge shroud in operation according to one embodiment of the present invention.

As illustrated in FIG. 9, the present invention can be provided with an adjustable discharge shroud 108 for regulating rearward displacement of the composting material by conveyor 56. Preferably, shroud 108 is substantially the same width as upper and lower returns 98 and 96. Discharge shroud 108 is pivotably mounted about a transverse pivot shaft 110 defining a horizontal shroud axis substantially parallel to the feeder axis. Discharge shroud 108 is sufficiently s paced from lifting cleats 102 as they pass over upper return 98 to allow composting material to pass therebetween. Discharge shroud 108 has an upper portion 111 at least partially covering the upper portion of conveyor 56, and a rearward portion 112a, 112b, 112c, and 112d extending from upper portion 111 behind conveyor 56. The position of discharge shroud 108 is adjustable about the shroud axis as agitator 48 progresses through the composting bed in the bay. Preferably, in the full open position rearward portion 112d of discharge shroud 108 does not significantly interfere with the rearward projection of composting material by conveyor 56. Typically, full rearward airborne displacement of composting material is between about 12 and 14 feet. Discharge shroud 108 preferably moves from a closed position 112a through approximately 32° to full open position 112d. Discharge shroud 108 can be actuated by conventional means, such as electrically, hydraulically, or pneumatically. In one embodiment, at least one hydraulic cylinder 116 moves discharge shroud 108 about the shroud axis.

Suitable discharge may also be accomplished by, for example, a baffle plate (not shown) mounted for variable rearward spacing from the top of the conveyor; a variable sliding deck (not shown) mounted at the bottom of a reversibly rotating conveyor; and/or variable angular disposition of the conveyor about a transverse pivot axis (not shown). Similarly, varying the angle of and/or telescoping conveyor 56 will be understood to provide alternatives suitable in particular applications for regulating rearward displacement of the composting material. As disclosed above, at least one hydraulic cylinder 116 can be provided for controlling the position of discharge shroud 108. The angle of discharge shroud 108 can be controlled simply as a function of the forward distance traveled by agitator 48 in the bay, or by a sensor and actuator system (not shown) that measures the depth of bed 38 of composting material and generates a bed depth signal corresponding thereto. The sensor is preferably mounted to structural frame 52 such that the sensor extends outwardly, forward of agitator 48 as it travels through the bay. The sensor may comprise a sonar signal transponder and/or one or more electric eyes or the like.

In the following discussion of a preferred embodiment of the present invention, reference will be made to a "compost agitating assembly," which includes feeder 54, feeder frame 84, and bridge breaker 58. In the preferred embodiment, conveyor 56 can be pivotably mounted to main frame 52 through pivot bar 130 and to feeder frame 84 through lower return 96. An assembly motor 132 can be provided to lift conveyor 56 along with the compost agitating assembly attached thereto from a lowered position, shown in full lines in FIG. 2, to a raised position, shown in broken lines in FIG. 2, in preparing agitator 48 for transport. In the lowered position, the compost agitating assembly extends downward from main frame 52 so that, in use, the compost agitating assembly will extend into the composting bay to engage composting material 38 therein. In the raised position, the compost agitating assembly and conveyor 56 are positioned so that the both units are above the walls of the composting bay, facilitating movement of agitator 48 onto and off of the composting bays. Furthermore, when in the raised position, agitator 48 has a relatively compact shape, which simplifies transporting the machine from one location to another.

Accordingly, with reference to FIG. 1, a shuttle dolly 90 can be provided which can carry agitator 48 laterally on rails 92 from bay to bay where it is again lowered to begin treatment of the composting bed therein. A system controller (not shown) can be provided to selectively actuate assembly motor 122 to move the compost agitating assembly to the lowered position when the agitator reaches a position adjacent a first end 15 of the composting bay and to move the assembly to the raised position when the agitator reaches a position adjacent a second end 17 of the composting bay to allow ingress of agitator 48 into transfer dolly 90. Suitable controllers are known to those skilled in the art and can include motion sensors, magnetic sensors, and the like.

As shown in FIGS. 1 and 9, ventilation systems 40, 41, 42, 43, and 44 are positioned at spaced locations along bays 12–20 to force air up through the composting material. Typically, ventilation systems 40–44 have sensors (not shown) to monitor the temperature of the composting material and to generate a signal in response to the temperature. Preferably, recessed sensors are used. Controllers (not shown) in communication with the sensors receive the signal and actuate ventilation systems 40–44 when the temperature of the composting material adjacent to the sensors reaches a predetermined value. Blowers 46 in communication with the controllers conduct air through the composting material when the ventilation systems are activated. In this manner ventilation systems 40–44 help to maintain aerobic conditions and control composting temperatures.

During approximately the first seven days of composting, including at least three consecutive days, the temperature preferably is maintained at a temperature sufficient for pathogen destruction. More preferably, the temperature is maintained above about 55° C.; most preferably, the temperature is between about 55° and 60° C. The temperature in later portions of bed 38 (closer to discharge end 17 of the bay) generally is maintained below about 55° C. for maximum microbial population and action in the composting process. Preferably, this temperature is between about 40° and 45° C. Those skilled in the art will recognize that particular temperature programs, moisture content, residence time, and the like are dictated by the particular composting operation and materials, as well as by applicable local, state, and/or federal regulations.

It will be understood that each of the elements described above or two or more together may also find utility in applications different from those described above. While the invention has been illustrated and described as embodied in a composting system, it is not intended to be limited to the details shown since various modifications and substitutions may be made without departing in any way from the spirit of the present invention. Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. An agitator for aerating and displacing composting material in a composting bay, said agitator, comprising:
   at least one structural frame member;
   a conveyor mounted to the structural frame member for discharging the composting material from the agitator into the composting bay;
   a feeder mounted to the structural frame member for taking the composting material from the bay and feeding the composting material to the conveyor; and
   at least one bridge breaker mounted to the structural frame member for contacting the composting material and causing the composting material to fall substantially evenly onto the feeder.

2. The agitator of claim 1, wherein the feeder is a rotating drum positioned forward of the conveyor.

3. The agitator of claim 1, wherein the feeder includes a plurality of outwardly extending protrusions spaced over an outside circumferential surface of the feeder.

4. The agitator of claim 1, wherein the agitator further comprises an adjustable discharge shroud for regulating discharge of the composting material by the conveyor.

5. The agitator of claim 1, wherein the at least one bridge breaker comprises at least one support member mounted to the structural frame member of the agitator, a displacement shaft rotatably mounted to the support member, and a power source in communication with the displacement shaft for rotating the shaft.

6. The agitator of claim 5, wherein the displacement shaft includes a plurality of outwardly extending protrusions spaced over an outside circumferential surface of the displacement shaft.

7. The agitator of claim 5, wherein the at least one support member is pivotably mounted to the structural frame member of the agitator.

8. The agitator of claim 7, wherein the at least one bridge breaker further comprises a second power source in communication with the at least one pivotably mounted support member such that the at least one bridge breaker is capable of oscillating vertical movement when in contact with the composting material.

9. The agitator of claim 1, wherein the at least one bridge breaker extends along a substantially horizontal plane above the uppermost surface of the feeder.

10. The agitator of claim 1, wherein the at least one bridge breaker is positioned forward of the feeder such that the at least one bridge breaker contacts the composting material before the feeder as the agitator passes through the composting bay.

11. A method of aerating and displacing composting material in a composting bay with an agitator comprising at least one structural frame member, a feeder mounted to the structural frame member, a conveyor mounted to the structural frame member, and at least one bridge breaker mounted to the structural frame member, said method comprising:
   contacting the composting material with the at least one bridge breaker such that the composting material falls substantially evenly onto the feeder;
   contacting the composting material with the feeder such that the feeder takes the composting material from the bay and feeds the composting material to the conveyor;
   contacting the composting material with the conveyor such that the composting material is discharged from the agitator.

12. The method of claim 11, further comprising oscillating the at least one bridge breaker in a substantially vertical plane above the feeder.

13. The method of claim 11, further comprising providing an adjustable discharge shroud for regulating the discharge of the composting material by the conveyor.

14. The method of claim 11, wherein the feeder is a rotating drum positioned forward of the conveyor.

15. The method of claim 11, wherein the feeder includes a plurality of outwardly extending protrusions spaced over an outside circumferential surface of the feeder.

16. The method of claim 11, wherein the at least one bridge breaker comprises at least one support member mounted to the structural frame member of the agitator, a displacement shaft rotatably mounted to the support member, and a power source in communication with the displacement shaft for rotating the shaft.

17. The method of claim 16, wherein the displacement shaft includes a plurality of outwardly extending protrusions spaced over an outside circumferential surface of the displacement shaft.

18. The method of claim 11, wherein the at least one bridge breaker extends along a substantially horizontal plane above the uppermost surface of the feeder.

19. The method of claim 11, further comprising positioning the at least one bridge breaker forward of the feeder such that the at least one bridge breaker contacts the composting material before the feeder as the agitator passes through the composting bay.

20. An in-vessel composting system, comprising:
   at least one composting bay capable of receiving composting material, and
   at least one agitator for aerating and displacing the composting material in the composting bay, wherein the agitator comprises:
      at least one structural frame member;
      a conveyor mounted to the structural frame member for discharging the composting material from the agitator into the composting bay;
      a feeder mounted to the structural frame member for taking the composting material from the bay and feeding the composting material to the conveyor; and
      at least one bridge breaker mounted to the structural frame member for contacting the composting material and causing the composting material to fall substantially evenly onto the feeder.

21. The in-vessel composting system of claim 20, further comprising a ventilation system in communication with the interior of the composting bay to selectively conduct air through the composting material to ventilate and control the temperature thereof, said ventilation system comprising:
   a sensor to monitor the temperature of the composting material and to generate a signal in response to said temperature;
   a controller in communication with the sensor to receive said signal therefrom and to actuate the ventilation system when the temperature of the composting material reaches a predetermined value; and
   a blower in communication with the controller to conduct air through the composting material when the ventilation system is actuated.

22. The in-vessel composting system of claim 20, wherein the feeder is a rotating drum positioned forward of the conveyor.

23. The in-vessel composting system of claim 20, wherein the feeder includes a plurality of outwardly extending protrusions spaced over an outside circumferential surface of the feeder.

24. The in-vessel composting system of claim 20, wherein the agitator further comprises an adjustable discharge shroud for selectively regulating rearward discharge of the composting material by the conveyor, rearward discharge distance being selectively adjustable as the agitator progresses through the composting bay by adjustment of the position of the discharge shroud in the path of discharge of the composting material, the discharge shroud having a width substantially equal to the width of the bay, to produce a composting bed of substantially uniform height behind the agitator.

25. The in-vessel composting system of claim 20, wherein the at least one bridge breaker comprises at least one support member mounted to the structural frame member of the agitator, a displacement shaft rotatably mounted to the support member, and a power source in communication with the displacement shaft for rotating the shaft.

26. The in-vessel composting system of claim 25, wherein the displacement shaft includes a plurality of outwardly extending protrusions spaced over an outside circumferential surface of the displacement shaft.

27. The in-vessel composting system of claim 25, wherein the at least one support member is pivotably mounted to the structural frame member of the agitator.

28. The in-vessel composting system of claim 27, wherein the at least one bridge breaker further comprises a second power source in communication with the at least one pivotably mounted support member such that the at least one bridge breaker is capable of oscillating vertical movement when in contact with the composting material.

29. The in-vessel composting system of claim 20, wherein the at least one bridge breaker extends along a substantially horizontal plane above the uppermost surface of the feeder.

30. The in-vessel composting system of claim 20, wherein the at least one bridge breaker is positioned forward of the feeder such that the at least one bridge breaker contacts the composting material before the feeder as the agitator passes through the composting bay.

31. A composting facility, comprising:
a plurality of composting bays to receive and hold composting material during decomposition, each composting bay having a front end and a back end;
an enclosure capable of housing the plurality of composting bays therein;
at least one agitator for aerating and displacing the composting material in the composting bay, wherein the agitator comprises:
at least one structural frame member,
a conveyor mounted to the structural frame member for discharging the composting material from the agitator into the composting bay,
a compost agitating assembly rotatably connected to the structural frame member whereby the compost agitating assembly is capable of movement between lowered and raised positions, the compost agitating assembly having a first support member, a second support member, a feeder mounted to the first support member for taking the composting material from the bay and feeding the composting material to the conveyor, and at least one bridge breaker mounted to the second support member for contacting the composting material and causing the composting material to fall substantially evenly onto the feeder, and
at least one transfer dolly positioned near at least one of the ends of at least one of the plurality of composting bays to transport the agitator from one of the plurality of composting bays to another of the plurality of composting bays.

32. The composting facility of claim 31, wherein the agitator further comprises an assembly motor connected to the compost agitating assembly to move said assembly between the lowered and raised positions.

33. The composting facility of claim 32, further comprising a system controller in communication with the assembly motor to selectively actuate the assembly motor to move the compost agitating assembly to the lowered position when the agitator reaches a position adjacent a first end of the composting bay and to move the compost agitating assembly to the raised position when the agitator reaches a position adjacent a second end of the composting bay to allow ingress of the agitator into the transfer dolly.

34. The composting facility of claim 31, wherein the feeder is a rotating drum positioned forward of the conveyor.

35. The composting facility of claim 31, wherein the feeder includes a plurality of outwardly extending protrusions spaced over an outside circumferential surface of the feeder.

36. The composting facility of claim 31, wherein the agitator further comprises an adjustable discharge shroud for selectively regulating rearward discharge of the composting material by the conveyor, rearward discharge distance being selectively adjustable as the agitator progresses through the composting bay by adjustment of the position of the discharge shroud in the path of discharge of the composting material, the discharge shroud having a width substantially equal to the width of the bay, to produce a composting bed of substantially uniform height behind the agitator.

37. The composting facility of claim 31, wherein the at least one bridge breaker comprises at least one support member mounted to the structural frame member of the agitator, a displacement shaft rotatably mounted to the support member, and a power source in communication with the displacement shaft for rotating the shaft.

38. The composting facility of claim 37, wherein the displacement shaft includes a plurality of outwardly extending protrusions spaced over an outside circumferential surface of the displacement shaft.

39. The composting facility of claim 37, wherein the at least one support member is pivotably mounted to the structural frame member of the agitator.

40. The composting facility of claim 39, wherein the at least one bridge breaker further comprises a second power source in communication with the at least one pivotably mounted support member such that the at least one bridge breaker is capable of oscillating vertical movement when in contact with the composting material.

41. The composting facility of claim 31, wherein the at least one bridge breaker extends along a substantially horizontal plane above the uppermost surface of the feeder.

42. The composting facility of claim 31, wherein the at least one bridge breaker is positioned forward of the feeder such that the at least one bridge breaker contacts the composting material before the feeder as the agitator passes through the composting bay.

* * * * *